United States Patent [19]
Harding

[11] 3,923,382
[45] Dec. 2, 1975

[54] MULTIFACETED MIRROR STRUCTURE FOR INFRARED RADIATION DETECTOR

[75] Inventor: William R. Harding, State College, Pa.

[73] Assignee: Leco Corporation, St. Joseph, Mich.

[22] Filed: Dec. 19, 1973

[21] Appl. No.: 426,144

[52] U.S. Cl. ................ 350/296; 350/288; 350/293; 340/258 D
[51] Int. Cl.$^{2}$ ............................................ G02B 5/10
[58] Field of Search ........... 350/292, 293, 294, 288, 350/102, 103; 340/258 D

[56] References Cited

UNITED STATES PATENTS

| | | | |
|---|---|---|---|
| 2,987,961 | 6/1961 | Cotton et al. | 350/292 |
| 3,258,840 | 7/1966 | Hedgewick | 350/103 |
| 3,703,718 | 11/1972 | Berman | 340/258 D |
| 3,744,117 | 7/1973 | Heenan | 350/103 |

OTHER PUBLICATIONS

Swarovski, Serial No. 322,151, Published May 4, 1943, Alien Property Custodian.

*Primary Examiner*—Alfred E. Smith
*Assistant Examiner*—Michael J. Tokar
*Attorney, Agent, or Firm*—Price, Heneveld, Huizenga, Cooper & Raymond W. Green

[57] ABSTRACT

Infrared radiation can be gathered from a number of discrete, spaced-apart fields of view and focused on a single sensing element with a multifaceted mirror. Each facet of the mirror is a concave surface, preferably spherical, which is focused on the radiation sensing element. This focusing can conveniently be accomplished by the use of a spherical surface having a radius of curvature half that of the individual segments which constitute the facets of the multifaceted mirror. The individual segments' focal points, which are midway between the spherical segments and the centers of curvature of the spherical segments, are thus all located in a common point, at which the radiation sensing element is located.

10 Claims, 3 Drawing Figures

16
20
23
15
19
22
14
18
21
13
17
12
11

MULTIFACETED MIRROR STRUCTURE FOR INFRARED RADIATION DETECTOR

BACKGROUND OF THE INVENTION

The construction of infrared intrusion detectors, i.e., infrared radiation detectors intended to produce an alarm upon the detection of an intruding human, poses both optical and detector fabrication problems. It is frequently desired to cover a 90° field of view, for example when the detector is placed in the corner of a room. Merely placing an infrared radiation detector in the room is infeasible. There must in addition be a focusing mechanism to gather infrared radiation from the intruder, wherever he or she might be, and focus this radiation on the infrared sensing element. If a spherical mirror is used to cover a 90° field of view, the detector must be large enough to cover this 90° field. For a low energy system, such as an intruding person entering the field of view of the detector, the energy received by the infrared radiation detecting element must be chopped and amplified many times in order to provide a sufficiently low detection limit that a human intruder can be detected. This approach then requires a large and complex system. The required detector element size would then have to be larger than practical. This is because the image plane of a spherical mirror is itself a spherical surface with the same radius of curvature as the focal length of the mirror (i.e., 1/2 the radius of curvature), with the same center as the mirror.

It is, therefore, an object of the present invention to provide a novel multifaceted mirror structure for an infrared radiation detector, which overcomes this problem of using a large spherical mirror and a large radiation detecting sensing element for use in an intrusion infrared radiation detector. Further objects of the present invention are to provide for producing such multifaceted mirror structures.

SUMMARY OF THE INVENTION

According to the present invention, there is provided a multifaceted mirror for gathering infrared radiation from a plurality of discrete, spaced-apart fields of view, and focusing said radiation on a single sensing element. This multifaceted mirror has a concave surface, this concave surface comprising a plurality of radiation gathering surface portions. Each of the radiation gathering surface portions is itself concave, has a focal length equal to that of the focal length of the other concave radiation gathering surface portions, and is placed in such a configuration that all of the concave surface portions have a common focal point. The shapes of the concave radiation gathering surface portions are preferably spherical polygons (such as hexagons) contiguously arranged so that their focal points are all at the sensing element of the radiation detector. Such a multifaceted mirror can be produced for example (1) by grinding the desired shape from a metallic base; (2) by mounting cut spherical polygonal segments on a spherical mirror in the desired configuration, and using this compound mirror as a mold to produce a molding negative which is in turn used to produce a positive image which is coated with radiation reflective coating to produce a multifaceted mirror; (3) by machining the desired molding negative directly from metal; or (4) by molding a molding negative from a previously produced mirror.

DETAILED DESCRIPTION

Figure 1:
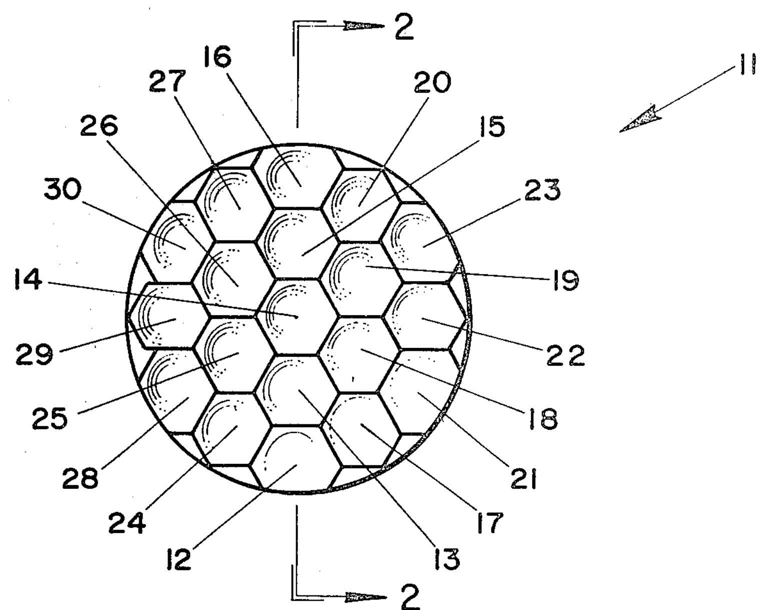
FIG. 1 is a plan view of a multifaceted mirror produced in accordance with the present invention.
Figure 2:
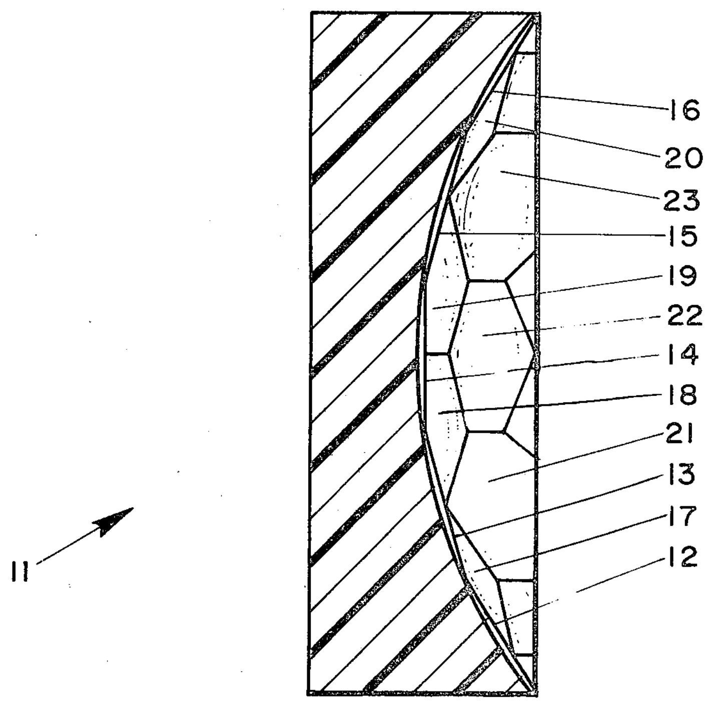
FIG. 2 is a cross-sectional view of the mirror in FIG. 1, showing the facets in greater detail.

Referring now to FIGS. 1 and 2, there is illustrated a multifaceted mirror 11 in accordance with the present invention. Mirror 11 is actually one piece, with a reflective coating to render the surfaces reflective, but mirror 11 is provided with a plurality (19 as shown) of individual radiation gathering surface portions 12–30. The individual surface portions can be of any desired shape or relative size, but it is preferred that these surface portions have the shape of a spherical polygon such as a spherical triangle, square, pentagon or hexagon. Preferred shapes are spherical squares, triangles or hexagons, with the spherical hexagon being particularly preferred. As more clearly illustrated in FIG. 2, the radiation gathering surface portions 12–30 are mounted along an inner imaginary spherical surface of multifaceted mirror 11, such that the various facets are all focused at a common focal point. If multifaceted mirror 11 is constructed in such a manner that the surfaces are sufficiently reflective, the mirror can be used without coating to reflect infrared radiation to the single sensing elements of an infrared radiation detector. More likely, however, it will be desired to provide infrared radiation reflective coating material 31 (see FIG. 3) in order to increase the amount of infrared radiation which is reflected by multifaceted mirror 11. This reflective coating is preferably a metallic reflective material placed on the mirror surface by methods familiar to those skilled in the art, such as evaporating aluminum or chromium (preferably aluminum) on the surface. A protective coating of silicon monoxide is preferably evaporated onto the mirror over the metallic reflective coating. The mirror is then placed in such an orientation that the sensing element 32 is at the focal point of each of the radiation gathering surface portions 12–30. As each of these surface portions is preferably a portion of a spherical surface, the distance between the radiation gathering surface portions 12–30 and the sensing element 32 is ½ the radius of curvature of the radiation gathering surface portions 12–30. Sensing element 32 is also at the center of curvature of the larger imaginary spherical surface on which the spherical radiation gathering surface portions 12–30 are conceptually located. That is to say, in the preferred embodiment of this invention, each of the concave surface portions 12–30 is a segment of a sphere, and each of these segments of a sphere has a radius of curvature passing through a common focal point at sensing element 32, the radii of a curvature of the segments 12–30 being of such length and orientation that the common focal point is equidistant between (a) each segment of a sphere which constitutes the radiation gathering surface portions 12–30, and (b) the center of a curvature of each such segment.

Figure 3:
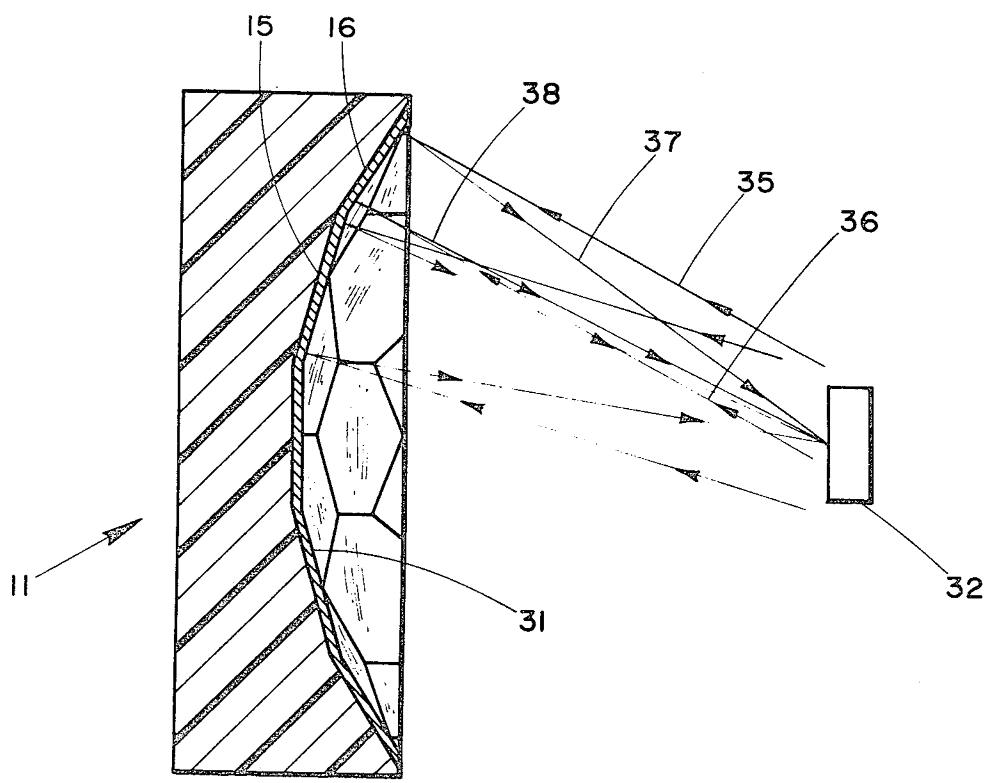
FIG. 3 is a cross-sectional view of a multifaceted mirror similar to that of FIGS. 1 and 2, comprising in addition a radiation reflective coating, and showing the relationship of the multifaceted mirror to the infrared radiation sensing element.

As shown in FIGS. 1 – 3, the radiation gathering surface portions are all of equal size and shape, but this situation can of course be altered if it is desired to produce a radiation detector which is more sensitive in one direction than another.

The invention will now be illustrated with an example.

EXAMPLE

A multifaceted mirror according to the present invention is produced by cutting a first spherical mirror having a radius of 3.0 inches and a focal length of 1.5 inches to form a plurality of segments, each having a spherical hexagonal shape. The sides of the hexagons are approximately ½ inch apart. A second spherical mirror having a radius of 1.5 inches, i.e., ½ that of the spherical segments, is then cut to form a mount for the spherical polygonal segments. The spherical polygonal segments are mounted on the second spherical mirror such that each segment has a common focal point, the focal point being at the center of curvature of the second spherical mirror.

A molding negative is then molded from the mounted spherical mirror segments, so that the molding negative has a shape complementary to that of the mounted spherical mirror segments. A positive image is then molded from the molding negative, such that the positive image has a shape essentially identical to that of the mounted spherical mirror segments, but is instead a single piece of molded plastic. This molded positive image is then coated with a metallic radiation reflective coating to form a multifaceted mirror.

In use, the multifaceted mirror is mounted in conjunction with a sensing element 32 as illustrated in FIG. 3. Rays of infrared radiation 35 and 36 which impinge upon the reflective surface coating on radiation gathering surface portion 16 are reflected as shown in reflected rays 37–38 to converge at sensing element 32. The incident rays of infrared radiation from other sources incident on the reflective coating upon other radiation gathering surface portions 12–15 and 17–30 are likewise focused at sensing element 32.

Sensing element 32 is connected to conventional circuitry such as is described for example in U.S. Pat. No. 3,604,933 or U.S. Pat. No. 3,703,718. The device when so constructed is found to be a sensitive infrared radiation intrusion detector, which can be mounted in a corner of a room to cover 19 separate zones, one for each of the radiation gathering surface portions 12–30, and thereby provide protection against intruders entering into widely separated portions of the room.

Another method of producing such a multifaceted mirror according to the present invention comprises grinding the desired shape from a metallic base and polishing the radiation gathering surface portions, whereby to render them reflective of infrared radiation. Yet another method for producing such a multifaceted mirror according to the present invention comprises the steps of machining from metal a molding negative having a convex surface, said convex surface comprising a plurality of convex surface portions, each having an equal focal length and having a common focal point; molding a positive image from said molding negative, and coating the molded positive image with a radiation reflective coating, whereby to form a multifaceted mirror. Yet another method of producing a multifaceted mirror according to the present invention comprises the steps of molding a molding negative from a multifaceted concave surface having the desired shape, such a one which has been produced in accordance with one of the other methods of the invention, the multifaceted concave surface comprising a plurality of concave surface portions having an equal focal length and a common focal point; molding a positive image from the molding negative; and coating the molded positive image with a radiation reflective coating, whereby to form a multifaceted mirror.

I claim:

1. A single-piece multifaceted mirror for gathering infrared radiation from a plurality of discrete, non-parallel, spaced-apart fields of view, and focusing said radiation on a single sensing element, said single-piece multifaceted mirror having a concave surface, said concave surface comprising a plurality of radiation gathering surface portions, each of said radiation gathering surface portions being concave, having an equal focal length, and having a common focal point; the radiation gathering surface portions being so arranged that each radiation gathering surface portion gathers radiation from a separate, discrete, spaced-apart field of view.

2. A multifaceted mirror according to claim 1, wherein each of said concave surface portions is a segment of a sphere, each of said segments of a sphere having a radius of curvature passing through a common focal point, the radii of curvature of said segments of a sphere being of such length and orientation that the common focal point is equidistant between a. each segment of a sphere which constitutes the radiation gathering surface portions, and b. the center of curvature of each such segment.

3. A multifaceted mirror according to claim 2, wherein each said radiation gathering surface portion is a spherical polygon.

4. A multifaceted mirror according to claim 3, wherein each said radiation gathering surface portion is a spherical hexagon.

5. A multifaceted mirror according to claim 3, wherein each said radiation gathering surface portion is a spherical square.

6. A multifaceted mirror according to claim 3, wherein each said radiation gathering surface is a spherical triangle.

7. A multifaceted mirror according to claim 3, wherein said radiation gathering surface portions are contiguous.

8. A multifaceted mirror according to claim 7, wherein said concave mirror comprises 19 contiguous hexagonal radiation gathering surface portions.

9. A multifaceted mirror according to claim 1, comprising in addition a radiation reflective coating on said radiation gathering surface portions.

10. A multifaceted mirror according to claim 1, wherein the radiation gathering surface portions are so arranged that each radiation gathering surface portion reflects radiation incident from a discrete, spaced-apart field of view which field of view is non-parallel to each other field of view from which radiation is gathered by other elements; said multifaceted mirror being round and having a radius of about 1.5 inches.

* * * * *